United States Patent [19]

Knott

[11] 3,868,622

[45] Feb. 25, 1975

[54] RANGE RATE COMPENSATION SYSTEM

[75] Inventor: Sydney T. Knott, Barnstable, Mass.

[73] Assignee: The United States of America as represented by the Secretary of the Navy, Washington, D.C.

[22] Filed: Dec. 9, 1960

[21] Appl. No.: 75,040

[52] U.S. Cl. ............................ 340/3 R, 346/33 EC
[51] Int. Cl. .......................... G01s 9/68, G01s 7/60
[58] Field of Search ............. 340/3, 1, 5, 6; 346/33, 346/44, 74, 74 CH; 343/5

[56] References Cited
UNITED STATES PATENTS

| | | | |
|---|---|---|---|
| 2,350,994 | 6/1944 | Anderson | 340/3 |
| 2,910,666 | 10/1959 | Hardgrove et al. | 340/3 |
| 2,925,580 | 2/1960 | Schumacher | 340/3 |
| 2,941,183 | 6/1960 | Bischof | 340/3 |
| 2,982,940 | 5/1961 | Fryklund | 340/3 |
| 3,076,173 | 1/1963 | Richter | 340/3 |

FOREIGN PATENTS OR APPLICATIONS

| | | | |
|---|---|---|---|
| 756,577 | 9/1956 | Great Britain | 340/3 |

Primary Examiner—Richard A. Farley
Attorney, Agent, or Firm—R. S. Sciascia; L. I. Shrago

[57] ABSTRACT

1. In a sonar system of the type wherein search pulses are periodically transmitted by a transducer and echo pulses produced by reflecting targets in the propagation path of said search pulses subsequently detected by said transducer, a first recorder having a moving strip of paper, means for registering each search pulse adjacent one reference edge of said moving paper and echo pulses derived therefrom variable horizontal distances away in accordance with the range to the reflected target producing these echo pulses, a second recorder having a moving strip of paper and means for simultaneously registering successive echo pulses from the same target the same distance away from a corresponding reference edge of said last-mentioned strip of paper whereby the range of said targets can be determined from an examination of said first recorder and changes in the appearance of the echo pulses from the same target can be observed on the second recorder.

7 Claims, 3 Drawing Figures

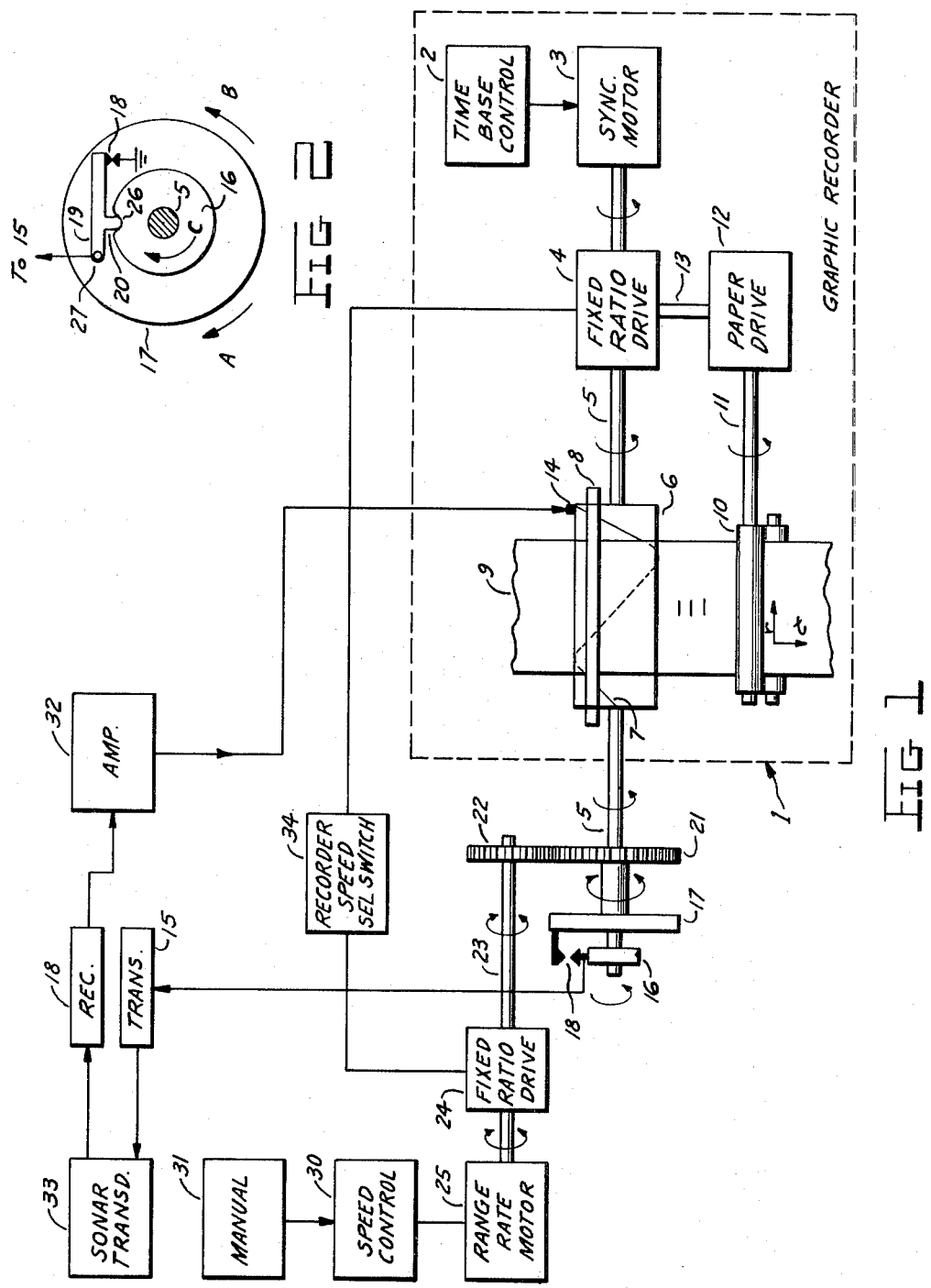

RANGE RATE COMPENSATION SYSTEM

The present invention relates generally to underwater object locating and detecting systems and more particularly to apparatus for and methods of facilitating the identification and classification of moving targets and other types of sound reflecting structures.

In the conventional type of echo ranging underwater object locating system, the transducer radiates acoustic search pulses during the transmitting phase of the cycle, and these pulses, after reflection from objects located within the propagation path, are detected subsequently by the same transducer during the receiving portion of the cycle. The search pulses are radiated on a regular schedule or at a definite repetition rate which can be increased to provide greater target information when the range is changing. The time of transmission of each search pulse defines the commencement of the timing period, and this period corresponds to the round-trip travel time from which target range is determined.

When the target is moving with respect to the sonar transducer, successive echo pulses arrive at different times in their cycles; and, if these echoes are recorded by means of, for example, a helical type graphic recorder, the target presentation migrates across the paper in step with the attendant changes in target range.

The structure of the target echoes as it appears on the recording paper oftentimes provides a valuable aid in identifying and classifying the nature of the target and its attitude with respect to the search transducer. But when these echoes fall obliquely across the recording paper as a consequence of changing range, it is difficult for the operator to discern the common and distinguishing details of these structures since he must visually compare, in effect, a multiplicity of markings which are not in registry. Consequently, slight variations in the echo structure which may be indicative of, for example, a change in the target aspect occasioned by a shift in its course may be unnoticed. The earliest recognition of these slight variations in the composition of the echo pulse is desirable since the operator is put on notice that the maneuvering target is, perhaps, about to alter its course.

It is accordingly a primary object of the present invention to provide an underwater object locating system wherein the target echoes are recorded such that variations in their structures can be readily ascertained by visual inspection.

Another object of the present invention is to provide an underwater object locating system wherein successive target pulses reflected from a moving object are recorded in alignment to facilitate their comparison.

A further object of the present invention is to provide an underwater object locating system wherein successive echoes from a moving target are recorded in registry on a graphic recorder for target classification purposes.

A still further object of the present invention is to provide an echo ranging system where successive search pulses are transmitted at different times so as to permit corresponding echo pulses to be recorded in alignment.

A yet still further object of the present invention is to provide an underwater echo ranging system wherein the search pulses are not transmitted at a regular repetition rate.

Another object of the present invention is to provide an underwater echo ranging system wherein the echo pulses are displayed on two graphic recorders whose range scales can be independently changed for target identification purposes.

A yet still further object of the present invention is to provide a sonar system with a pair of graphic recorders with the target traces displayed in registry on one recorder and in step with changing range on the other recorder.

A yet still further object of the present invention is to provide an underwater object locating system employing two graphic recorders so that the range scale on one of these recorders can be expanded at any time without losing target range or influencing the repetition rate of the search pulses.

Other objects and many of the attendant advantages of this invention will be readily appreciated as the same becomes better understood by reference to the following detailed description when considered in connection with the accompanying drawings wherein:

FIG. 1 illustrates one embodiment of the present invention for vertically aligning on a precision graphic recorder successive echo pulses reflected from a moving target;

FIG. 2 shows in detail a keying apparatus of FIG. 1; and

Figure 3:
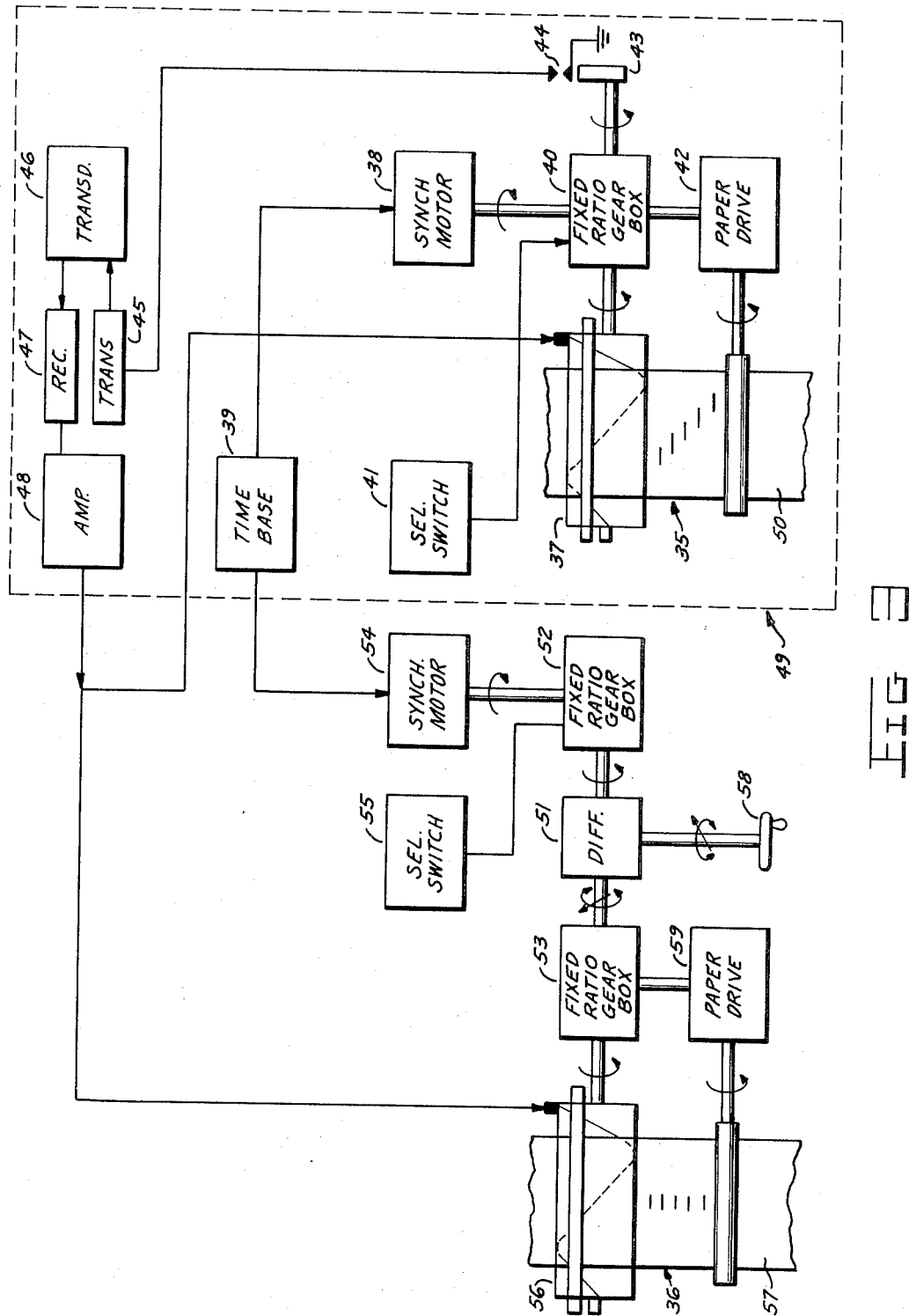
FIG. 3 shows an alternative method of practicing the present invention with two graphic recorders which display the target pulses in a conventional manner and in vertical alignment.

The above objects of invention are realized, according to the present invention, by departing from the conventional technique employed in most underwater object locating systems wherein the search pulses are radiated at a fixed repetition rate and wherein the echo pulses are received at variable times thereafter, depending upon the round-trip travel time involved. In systems using the above technique, the transmitted pulses are usually recorded in alignment along one edge of the recording medium and the echo pulses appear at variable distances therefrom. In the present invention, the above relationship is, in effect, reversed, that is, the transmitted pulses are not radiated at a fixed repetition rate but at different times in successive cycles with each time being determined by the change in range of the target as previously observed. Thus, if in one case the target range is increasing so that the next echo pulse would otherwise be recorded at a time later than its predecessor, the system of the present invention advances the time of transmission of this search pulse so that its corresponding target pulse tends to fall in alignment with the previously recorded target pulse. In the reverse situation, when the range to the target is closing, the time of transmission of the next search pulse is delayed. Although successive target pulses are recorded in vertical alignment on the recording paper, the range of the target is still available to the operator since the search pulses introduce the variable previously provided by the recorded target pulses. Thus, as in the conventional system, range can be directly computed from an examination of the displacement between a particular transmitted pulse and its corresponding echo pulse.

According to one modification of the present invention, a conventional precision graphic recorder, employing as its recording element a rotating helix, is driven at variable speeds depending upon the target range involved, also drives a keying cam which is adapted to close the circuit to the sonar transmitter. Associated with this cam is a mounting plate which has secured thereto the contact arm of the keying device, and means are provided for displacing this mounting plate with respect to the cam so that the time of closure of the keying mechanism can be advanced or retarded. The recording of the echo pulses is in conformity with conventional practices, and the precision graphic recorder is used in its normal fashion. However, successive search pulses are not registered along the left-hand edge, for example, of the paper, but at different distances therefrom, depending upon the time of closure of the circuit energizing the sonar transmitter.

In an alternative modification, two precision graphic recorders are employed with one recording echo pulses from a moving target at varying distances from one edge of the recording paper in step with changes in target range and the other displaying these echo pulses in vertical alignment on the recording paper at any convenient distance from the same edge. One of these recorders, the one which displays the echo pulses in the conventional manner, controls the radiation of the search pulses. The other recorder is essentially a slave having a rotating helical timing element whose rate of rotation can be independently varied from that of the other recorder for, for example, giving an expanded range or better target definition.

Referring now to FIG. 1 of the drawings, a precision graphic recorder capable of being used with a conventional sonar system is schematically depicted within the dotted rectangular box, generally represented by reference character 1. Included in this apparatus is a time base circuit 2 which may take the form of a tuning fork for controlling the speed of a synchronous motor 3 which provides the main driving energy for the recorder. This motor is mechanically coupled to a fixed speed drive 4 and thence via shaft 5 to a cylinder 6 having a helix 7 embossed or otherwise raised from its surface. As is well known, this rotating helix serves as the timing element of the recorder, and the recording operation is performed by current flow between the moving point of intersection between this helix and a grounded metallic straight edge 8 displaced therefrom. Recording paper 9 is advanced between these confronting elements at a speed determined by the rate of rotation of cooperating rollers 10 forming part of the paper transport mechanism. The necessary synchronism between the paper feed and the rate of rotation of the helix is achieved by having the paper drive 12 mechanically coupled via shaft 13 to the fixed speed drive 4.

From an examination of the construction of this recorder, it will be appreciated that the recording operation of the present invention is essentially the same as that found in conventional sonar systems and that the input voltage pulses from acoustic amplifier 32 are applied via brush 14 to the rotating helix, the resultant electrical current flow between this helix and the straight edge 8 discoloring the recording paper 9 and producing a graphic indication of the composition of the recorded echo pulses. The range to the target in this illustration is, of course, measured from the left-hand edge of the recording paper.

From what has been said hereinbefore, it will be recalled that the present invention brings successive echo pulses from the same moving target into substantial registry by varying the time of transmission of their corresponding search pulses. To accomplish this mode of operation, the activation of transmitter 15 and transducer 33 is controlled by a switching device consisting of a keying cam 16, a keying contact mounting plate 17 and a pair of contacts 18, the details of this assembly being best illustrated in FIG. 2. Referring now to this figure, it will be seen that keying cam 16 has a depression 26 formed in its peripheral surface, and this cam is secured to shaft 5, an extension of the driveshaft which turns the helix cylinder 6 and rotates in synchronism therewith. Keying plate 17 is also mounted on this shaft but is free to rotate thereabout, and this plate is driven from range rate motor 25, whose operation will be discussed hereinafter, via fixed ratio drive 24, shaft 23 and cooperating gears 22 and 21. Secured to keying plate 17 so as to be rotatable therewith is a contact arm 19 having a projection 20 which rides along the peripheral surface of cam 16. Thus, when this projection encounters depression 26, contact arm 19 rotates about its fixed pivot point 27 in a clockwise direction under the action of a suitable spring, not shown, and brings the contacts of switch 18 together, thereby closing the circuit for activating transmitter 15. From an inspection of the above figures, it will be appreciated that the time of contact closure in each cycle of rotation of helix 7 can be altered by either advancing or retarding the position of mounting plate 17 with respect to cam 16. In other words, if, for example, keying contact plate 17 is rotated in the direction of arrow A of FIG. 2, with shaft 5 and cam 16 rotating in the direction of arrow C, the keying will be delayed and the time of radiation of the search pulse postponed. This, of course, will have the effect of moving the point of recording of the corresponding echo pulse to the right, as viewed on paper 9 of FIG. 1, all other things, of course, being equal. Likewise, by rotating keying plate 17 in the direction of arrow B, the keying is advanced so that with the same conditions still obtaining, the corresponding echo pulse will move to the left on the recording paper. It might be mentioned at this point that, with drive shaft 5 rotating in the direction shown, the recording sweep is from left to right so that echo pulses originating from receding targets appear at successively greater distances from the left-hand edge of the recording paper.

In order to permit the different ranges or time scales to be selected, graphic recorder 1 contains a manual speed selector switch 34. The function of this switch is to vary the gear ratios introduced by drive 4, associated with shaft 5, and drive 24, associated with shaft 23. By virtue of this interlocking arrangement, the relative speeds of rotation of cams 16 and keying contact plate 17 are not disturbed when the recorder is, for example, speeded up to obtain greater surveillance of closing targets.

Range rate motor 25, as mentioned hereinbefore, provides the drive for rotating keying contact plate 17 about drive shaft 5 of the recorder. This motor, which has a variable speed characteristic and is of the reversible type, is under the control of a speed control circuit 30 operated by manual device 31. In practice, if the operator sees from a visual inspection of the recording paper that the target is closing, for example, then via manual control 31 he sets the speed and direction of range rate motor 25 so that it drives shaft 23 in a direction and at a speed to cause keying contact plate 17 to rotate in the direction A as shown in FIG. 2. This results in the next keying operation being deferred and its corresponding echo pulse postponed and recorded at a position more nearly in alignment with its predecessor which was received when the target was at a greater range. Keying contact plate 21 can thus be continuously advanced in the case selected above, and successive keying pulses retarded so that their echo pulses will tend to be in registry on paper 9 as the target closes at a definite rate. If the target range is increasing, then the speed control circuit 30 is operated to reverse the direction of rotation of range rate motor 25 and to regulate its speed in this new direction so that keying contact plate 17 moves in the direction A, whereby the keying of the next search pulse is advanced. This advancement of the transmission, of course, tends to realign the next series of echo pulses and permit their comparison.

FIG. 3 illustrates an alternative method of practicing the present invention wherein echo pulses from a moving target are recorded simultaneously in a conventional manner and also in spatial alignment. To accomplish this, the system employs two similar graphic precision recorders 35 and 36. The timing helix 37 of the former recorder is driven by synchronous motor 38 whose speed is stabilized by time base circuit 39. The output shaft of this motor is coupled to a gear box 40 whose gear ratio can be changed by means of selector switch 41. This gear box also controls the paper drive feed mechanism 42. Rotating in synchronism with timing helix 37 is a cam 43 which closes contacts 44 once each recording cycle to energize transmitter 45 and thereby institute radiation of a search pulse from transducer 46. The echo pulse subsequently detected by this transducer is fed to a receiver 47 and to an amplifier 48. Thereafter, it is applied to rotating helix 37. It will thus be seen that the apparatus enclosed within dotted rectangular box 49 comprises a conventional echo ranging system wherein target pulses are recorded at varying distances from the left-hand edge of paper 50 in step with accompanying changes in target range. It would be pointed out that the pulse repetition rate of this system can be varied within limits by means of selector switch 41 which alters the gear ratio of gear box 40 and, hence, the speed of rotation of cam 43.

Precision graphic recorder 36 is similar in construction to recorder 35 except that it does not contain its own time base circuit but relies upon circuit 39 to maintain the speed of synchronous motor 54 constant. Also, a differential 51 is inserted in the drive system between a first gear box 52 and a second gear box 53. Timing helix 56 of this recorder is driven from the latter gear box so that its speed of rotation is under the control of both selector switch 55 and the manual control 58 of differential 51. Echo pulses from amplifier 48 are coupled to this recorder in accordance with the usual practice.

The operation of the system of FIG. 3 is as follows. Each cycle commences with cam 43 closing contacts 44 and the radiation of a search pulse by transducer 46. Thereafter, each reflected pulse as it appears in the output of amplifier 48 is coupled to helices 37 and 56 for producing a representation of the target. Because of the separate selector switches, both helices can rotate in synchronism or helix 56, for example, can rotate at an even multiple or a common fraction of its counterpart.

If the operator sees from an inspection of the target display provided by recorder 35 that, for example, the target is receding so that successive echo pulses appear further and further away from the left-hand edge of recording paper 50, he operates manual control 58 of differential 51 to slow down the speed of rotation of helix 56 of recorder 36. This adjustment or phasing, in effect, shifts the location of the next target pulse on recording paper 57 to the left, thereby counteracting the incremental increase in target range from the previous cycle. The target traces thus tend to be maintained in vertical alignment on the recording paper. Likewise, if the range to the target is decreasing so that echo pulses are being recorded closer and closer to the left-hand edge of recording paper 50, the operator rotates manual controller 58 to speed up the rate of rotation of helix 56. This correction compensates for the closing range and continues to keep the target traces in vertical alignment so that echo structure is more easily seen.

It would be noted in connection with the performance of graphic recorder 36 that this apparatus cannot be utilized generally to provide accurate target range since helix 56 no longer acts as a true timing reference because of its changing speed of rotation. Range information, of course, is always available at graphic recorder 35. Because of this second recording, the speed of rotation of helix 56 can be altered at any time to expand the range scale or improve target definition without losing track of the target range.

It would be mentioned also that, while the target display of FIG. 1 preserves the true round-trip pulse travel time or target range by varying the position of the outgoing pulse, nevertheless, it is difficult to read target range from its somewhat unconventional appearance.

For convenience of illustration, a simple manual control 58 is shown in FIG. 3 for introducing the proper corrections into the differential 51. In actual practice, however, this operation can be more efficiently carried out by either a manually controlled motor, a ball and disk combination, a Vickers hydraulic transmission system or a Graham variable speed drive. In connection with the operation of differential 51, the operator can determine by means of auxiliary instruments which, in effect, ascertain the slope of the line connecting corresponding parts of successive target traces, the rate at which the target range is changing, and thus set the speed control of, for example, the above manually controlled motor to anticipate forthcoming changes in range.

Also, conventional program circuits can be employed in the output circuits of amplifier 48 and the input circuit of transmitter 45 to alter the pulse repetition rate of the sonar system and enable the operator to select certain range intervals for inspection. Such a mode of operation is desirable where high speed recording sweeps are being used, with each of these sweeps representing but a fraction of the total echo travel time. It would be pointed out that the program circuits affiliated with graphic recorder 35 would control both the keying and recording functions of this apparatus, while the circuit associated with slave recorder 36 would only exercise control over the latter's recording operation. The system of FIG. 3 may be preferred over that of FIG. 1 since the availability of the two different types of target recordings facilitates an understanding of the nature of the target and its maneuvering action. Furthermore, the use in FIG. 3 of the second recorder, whose timing helix can be rotated at speeds different from that of the conventional recorder, allows the operator to shift to an expanded range display on this second recorder without causing accompanying changes in the pulse repetition rate of the sonar transducer. Such changes in the pulse repetition rate usually provide the submarine operator with information that his vessel has been detected and that the search vessel is on either a closing or opening course. This knowledge is important since it permits the submarine to take timely evasive action.

Obviously many modifications and variations of the present invention are possible in the light of the above teachings. It is therefore to be understood that within the scope of the appended claims the invention may be practiced otherwise than as specifically described.

What is claimed is:

1. In a sonar system of the type wherein search pulses are periodically transmitted by a transducer and echo pulses produced by reflecting targets in the propagation path of said search pulses subsequently detected by said transducer, a first recorder having a moving strip of paper, means for registering each search pulse adjacent one reference edge of said moving paper and echo pulses derived therefrom variable horizontal distances away in accordance with the range to the reflected target producing these echo pulses, a second recorder having a moving strip of paper and means for simultaneously registering successive echo pulses from the same target the same distance away from a corresponding reference edge of said last-mentioned strip of paper whereby the range of said targets can be determined from an examination of said first recorder and changes in the appearance of the echo pulses from the same target can be observed on the second recorder.

2. In an underwater sonar system, a transducer, said transducer radiating search pulses in the surrounding fluid medium when activated, recorder, said recorder including a cylinder having a timing helix projecting from its outer surface, means for rotating said cylinder at a constant speed through one complete rotation in the period between successive activations of said transducer, a metallic bar parallelly disposed with respect to the longitudinal axis of symmetry of said cylinder and a recording paper adapted to be moved between said bar and said cylinder, means for producing a current flow between a point on said helix and a confronting portion of said metallic bar at the time each search pulse is radiated and at the time echo pulses are detected by said transducer, and means coupled to said cylinder for activating said transducer in accordance with changes in the movement of a reflecting target whereby successive echo pulses produced by this target appear on said recording paper in vertical alignment for comparison purposes and whereby the separation between the recording positions of a search pulse and the echo pulses derived therefrom is indicative of the range of the targets producing said echo pulses.

3. In an arrangement as defined in claim 2 wherein said means for activating said transducer in accordance with changes in the movement of a reflected target includes a cam having a depression formed in its peripheral surface, said cam rotating in synchronism with the cylinder of said recorder, a contact arm having a projecting portion which rides on the peripheral surface of said cam, a switch, said contact arm closing said switch when the projecting portion thereof encounters said depression and means for displacing said cam with respect to said contact arm whereby said switch can be closed at different times in each cycle of rotation of said cylinder.

4. In an underwater object locating system, the combination of a transducer, said transducer when activated radiating search pulses in the surrounding fluid medium, a recorder, said recorder including as a component thereof a moving strip of paper, means for producing reference markings on said paper at the time of radiation of each search pulse, means for producing target markings on said paper at the time of detection by said transducer of echo pulses returned from reflecting targets located within the propagation path of each search pulse with the spatial separation on said paper between a reference marking and a target marking being representative of the range of the reflecting target producing said target markings, and means for varying the time of successive activations of said transducer in accordance with the change in range of a particular moving target so as to cause successive target markings representing said particular moving target to appear on said paper at the same distance from one edge thereof, successive reference markings accordingly appearing at changing distances from said one edge of said paper with the spatial separation on said paper between a reference marking and a target marking still being representative of the range of the reflecting targer producing said target markings.

5. In an arrangement as defined in claim 4 wherein said recorder includes a cylinder having a timing helix projecting therefrom, said cylinder rotating at a constant speed and adapted to rotate through one complete cycle in a time no greater than the time interval between successive activations of said transducer and wherein said means for varying the time of successive activations of said transducer includes a cam-operated switch, the cam element thereof rotating in synchronism with said cylinder and closing the contact elements of said switch once during each rotational cycle of said cylinder and means for independently rotating said cam element with respect to said cylinder thereby to cause said contacts to be closed at different points in the rotational cycle of said cylinder.

6. In an underwater object locating and detecting system, the combination of a transducer, said transducer radiating search pulses in the surrounding fluid medium when activated, a recorder, said recorder including a moving strip of paper and a cylinder having a timing helix projecting from its outer surface, said cylinder being rotated at a constant speed through one complete cycle in a period not greater than the time between successive activations of said transducer, means cooperating with said recorder and including said timing helix for producing reference markings on said paper at the time of radiation of each search pulse, means cooperating with said recorder including said timing helix for producing target markings on said paper at the time of detection by said transducer of echo pulses returned from reflecting targets located within the propagation path of each search pulse with the spatial separation on said paper between a reference marking and a target marking being representative of the range of the reflecting target producing said target markings, and means for varying the time of successive activations of said transducer in accordance with the change in range of a particular moving target so as to cause successive target markings representing said particular moving target to appear on said paper at the same distance from one edge thereof, successive reference markings accordingly appearing at changing distances from said one edge of said paper with the spatial separation on said paper between a reference marking and a target marking still being representative of the range of the reflecting target producing said target markings, said last-mentioned means including a cam-operated switch, the cam element thereof being coupled to said cylinder and rotating in synchronism therewith, and means for independently rotating said cam with respect to said cylinder thereby to cause said cam-operated switch to operate at different points in the cycle of rotation of said cylinder.

7. In an underwater sonar system, a transducer, means for activating said transducer thereby to radiate search pulses in the fluid medium within which said transducer is disposed, a recorder, said recorder including a cylinder having a timing helix projecting from its outer surface, means for rotating said cylinder at a constant speed through one complete cycle of rotation in a period not greater than the time between successive activations of said transducer, a metallic bar parallelly disposed with respect to the longitudinal axis of symmetry of said cylinder and a recording paper adapted to move between said bar and said cylinder, means for producing a current flow between said metallic bar and a confronting point on said helix at the time each search pulse is radiated and the time echo pulses are detected by said transducer, a cam-operated switching device for activating said transducer, the cam element thereof being mechanically coupled to said cylinder so as to rotate in synchronism therewith, said cam element operating said switching device once during each cycle of rotation of said cylinder and means for independently rotating said cam element with respect to said cylinder by an amount related to the changes in the movement of a reflected target, thereby to cause successive echo pulses produced by this target to appear on said recording paper in vertical alignment for comparison purposes with the separation between the recording positions of a search pulse and an echo pulse being indicative of the range of the target producing said echo pulse.

* * * * *